(12) United States Patent  
Monjo

(10) Patent No.: US 6,490,006 B1  
(45) Date of Patent: Dec. 3, 2002

(54) CHROMA KEY SYSTEM FOR DISCRIMINATING BETWEEN A SUBJECT AND A BACKGROUND OF THE SUBJECT BASED ON A CHANGING BACKGROUND COLOR

(75) Inventor: Yoshio Monjo, Myozai-gun (JP)

(73) Assignee: Daisho Denki Inc., Tokushima (JP)

( * ) Notice: Subject to any disclaimer, the term of this patent is extended or adjusted under 35 U.S.C. 154(b) by 0 days.

(21) Appl. No.: 09/378,507

(22) Filed: Aug. 20, 1999

(30) Foreign Application Priority Data

Aug. 22, 1998 (JP) .......................................... 10-251995

(51) Int. Cl.[7] .............................................. H04N 9/75
(52) U.S. Cl. ...................................... 348/587; 348/592
(58) Field of Search ............................... 348/587, 592, 348/586; H04N 9/75

(56) References Cited

U.S. PATENT DOCUMENTS

| 4,122,490 A | * | 10/1978 | Lish | 348/592 |
| 4,979,021 A | | 12/1990 | Thomas | 348/578 |
| 5,940,139 A | | 8/1999 | Smoot | 348/584 |
| 6,104,438 A | * | 8/2000 | Saito | 348/587 |

FOREIGN PATENT DOCUMENTS

| EP | 0 876 055 | 11/1998 |
| GB | 2 321 814 | 8/1998 |
| JP | 3-42788 | 9/1991 |
| JP | 3-285486 | 12/1991 |

* cited by examiner

*Primary Examiner*—Sherrie Hsia  
(74) *Attorney, Agent, or Firm*—Wenderoth, Lind & Ponack, L.L.P.

(57) ABSTRACT

The chroma key system discriminates background and non-background by color difference. Further, the chroma key system changes background color by illuminating the background via background illumination equipment, discriminates the changing background color as background, and thereby discriminates background from non-background. The chroma key system comprises a lighted control circuit operable to control the background illumination equipment so as to provide a color changeable illumination to the background, and a background discriminating and swapping circuit operable to discriminate the subject from the background using information within an image signal based on the color changeable illumination of the background.

20 Claims, 10 Drawing Sheets

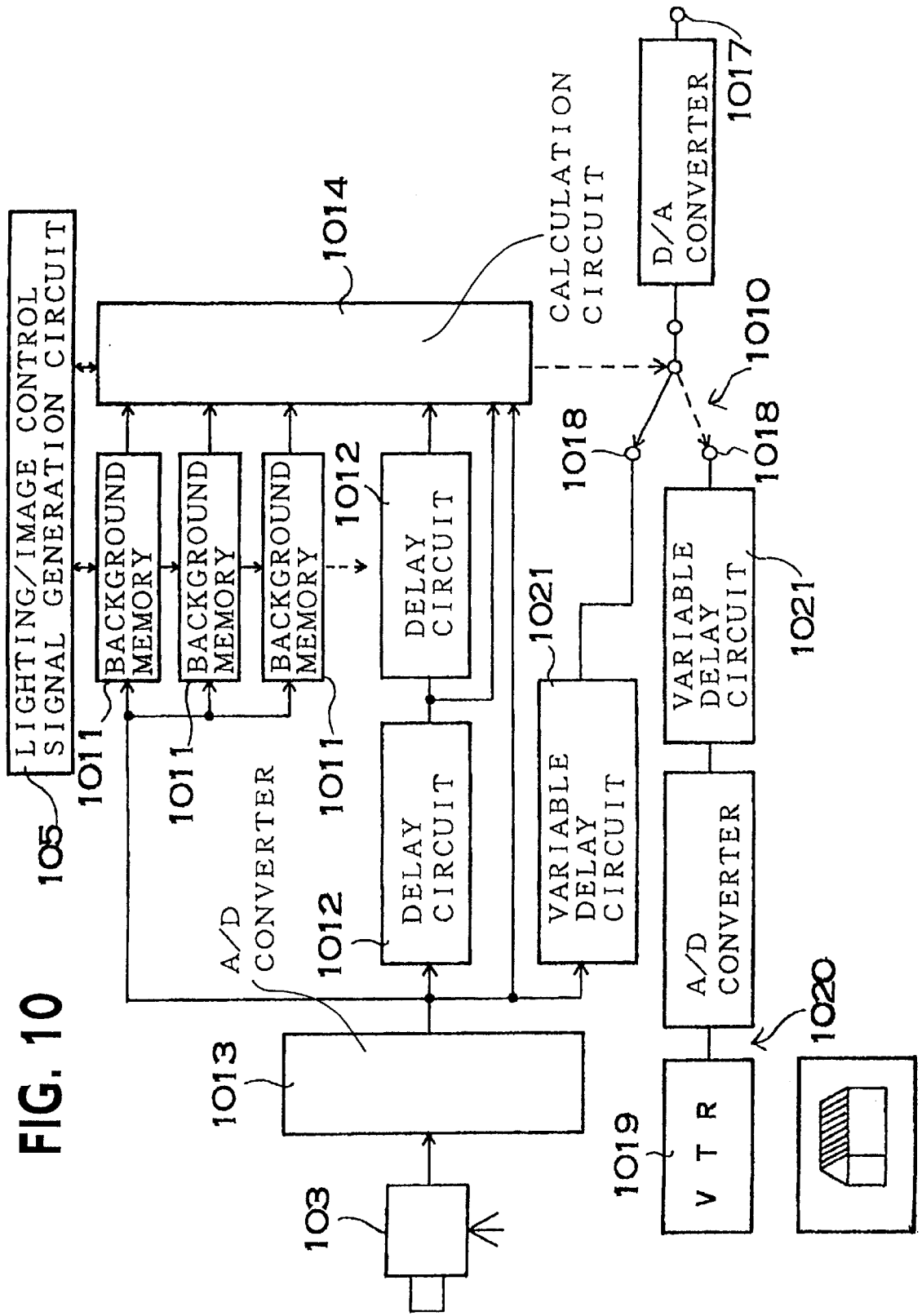

CHROMA KEY SYSTEM FOR DISCRIMINATING BETWEEN A SUBJECT AND A BACKGROUND OF THE SUBJECT BASED ON A CHANGING BACKGROUND COLOR

This application is based on application No.10-251995 filed in Japan on Aug. 22, 1998, the content of which incorporated hereinto by reference.

BACKGROUND OF THE INVENTION

This invention relates to a chroma key system which replaces background with a separately input image. A chroma key system is shown in FIG. 1. A chroma key system discriminates non-background, such as a human, from the background region of a picture input from a television camera 30. The detected background is replaced by a replacement image separately input from a video tape recorder, a laser disk, or another television camera. Since background is replaced with a different image when a chroma key system is used, it finds use in various applications. For example, a superimposed image of a commentator in front of a country's weather map is possible, or the commentator's background can be made into an entirely different scenery.

Prior art chroma key systems discriminate background from non-background by establishing a specific color for the background. In these systems, regions of specified color are taken as background, and regions of color different from the background color are taken as non-background. This discriminates non-background from background. Almost without exception, prior art systems specify blue as the background color, and discriminate blue regions as background and regions that are not blue as non-background.

As described above, prior art chroma key systems which discriminate background from non-background, have the drawback that non-background regions with the same color as the background are mistakenly taken to be in the background. For example, if a non-background commentator wears a necktie with the same color as the background, the necktie will be mistakenly determined to be background. This has the drawback that the region of the commentator's necktie will be changed into the replacement image. To avoid this problem, prior art requires care that every part of the non-background is not the same color as the background. This has the drawback of putting restrictions on the color of the non-background. In actuality, it is difficult to always make every part of the non-background a different color than the background. This is because the type of subject captured by the camera as non-background is not predetermined.

Therefore, prior art chroma key systems have drawbacks such as mistaken detection of one part of non-background as background and input of another image into that part.

The present invention was developed with the object of solving these types of problems with prior art chroma key systems. Thus a primary object of the present invention is to provide a chroma key system which eliminates non-background color restrictions, and which can accurately discriminate background with the data necessary for image synthesis in the background region screen even, for example, if a map, etc. is displayed or the studio set is used in place of a screen.

The above and further objects and features of the invention will more fully be apparent from the following detailed description with accompanying drawings.

SUMMARY OF THE INVENTION

The chroma key system of the present invention discriminates background from non-background by color differences. Further, the chroma key system of the present invention does not use a background which always has the same color, but rather is characterized by changing the background color. The changing background color is determined to discriminate background from non-background. The chroma key system of the present invention does not discriminate unchanging color as background. Background is discriminated by changing color under specified conditions. Therefore, the probability of a region of non-background changing color according to the same specified conditions as the changing background color is, in actual practice, approximately equal to zero. Even in the hypothetical case where a non-background region changed color according to the same conditions as the background, background and non-background regions could be correctly discriminated by controlling color changing conditions to be different than that of the non-background.

This type of chroma key system has the characteristic that non-background color restrictions are eliminated and background can be reliably and accurately discriminated. Further, since background and non-background can be discriminated by varying or flashing light in the background region, the system is characterized by allowing information necessary for image synthesis to be displayed on a background screen. In addition, since background can be discriminated when it is varied or flashed according to specified conditions, the background region is not restricted to a screen. Therefore, the system has the characteristic that even the studio set can be used as background. This is because the chroma key system of the present invention does not specify a background color, but rather changes background color and discriminates change in color as background.

The chroma key system of the present invention changes background color by illuminating the background via background illumination equipment. The chroma key system of the present invention uses devices such as light emitting diodes (LED's), projection television, etc. either alone or in combination as background illumination equipment. Further, in the chroma key system of the present invention, the background may be a television monitor wherein background color is changed by the television monitor. An image display cathode ray tube monitor or an array of many LED's for full color image display can be used.

The chroma key system of the present invention is provided with background illumination equipment to provide light on the background, a television camera to capture non-background and background, and a background discrimination and swapping circuit to discriminate background from television camera output and replace background regions with a different replacement image. The background discrimination and swapping circuit controls the background illumination equipment to change background color, and discriminates the changing background color to distinguish background regions.

The background discrimination and swapping circuit of the chroma key system of the present invention is configured with a lighting/image control signal generation circuit, a lighting control circuit which changes background color by controlling background illumination equipment via a light control signal output from the lighting/image control signal generation circuit, and a key signal generation and image signal swapping circuit which discriminates background from a discrimination signal output from the lighting/image control signal generation circuit and from the image signal output from the television camera and replaces the background with a replacement image.

In the chroma key system of the present invention, the background illumination equipment may be a projection television. The lighting/image control signal generation circuit outputs a background image signal to the projection television as the light control signal. The key signal generation and image signal swapping circuit discriminates background from the background image signal and from the image signal output from the television camera and replaces the background with a replacement image.

BRIEF DESCRIPTION OF THE DRAWINGS

FIG. 10 is a block diagram showing still another embodiment of the chroma key system of the present invention.

DETAILED DESCRIPTION OF THE INVENTION

Figure 1:
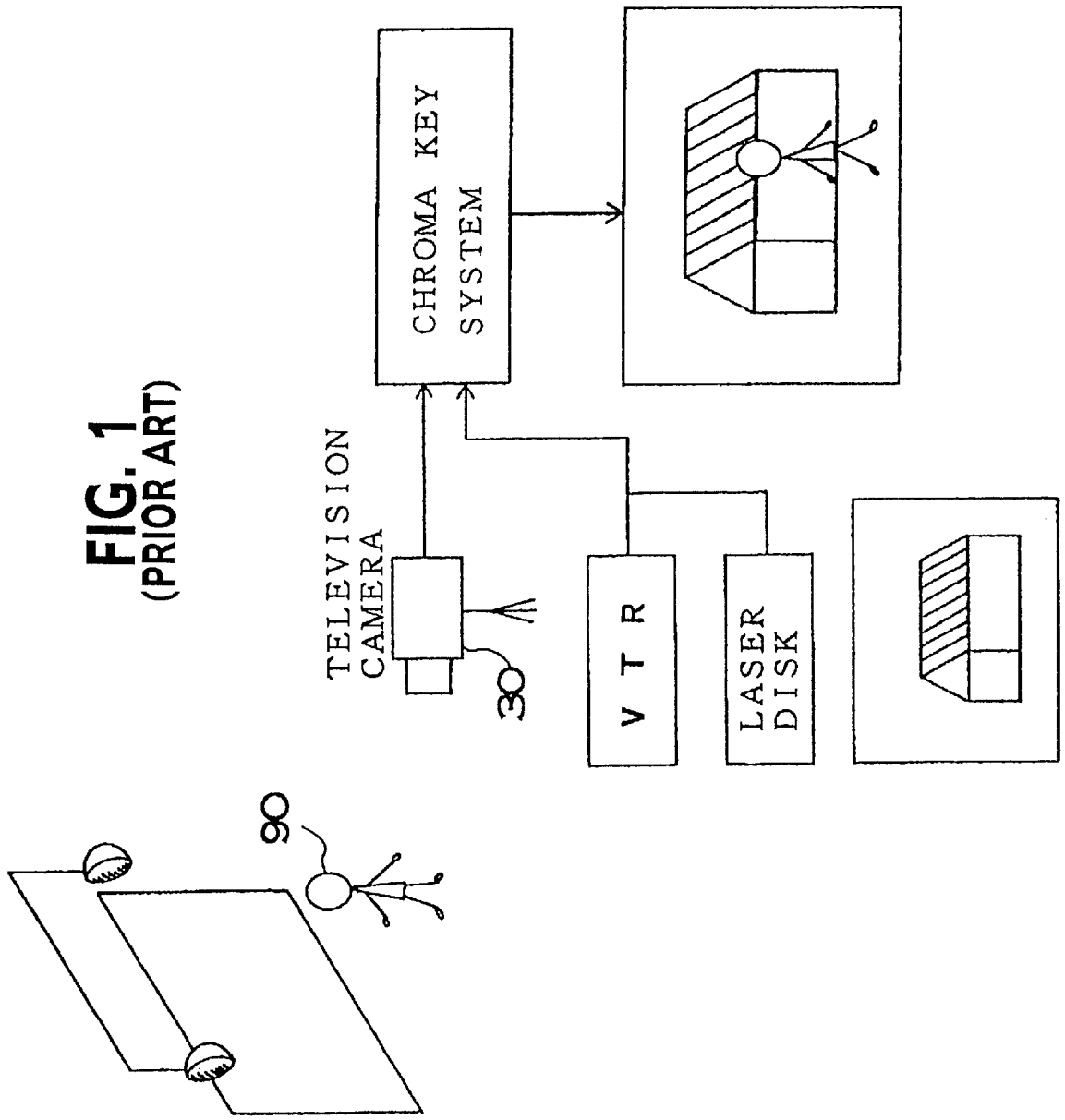
FIG. 1 is a block diagram showing a prior art chroma key system.
Figure 2:
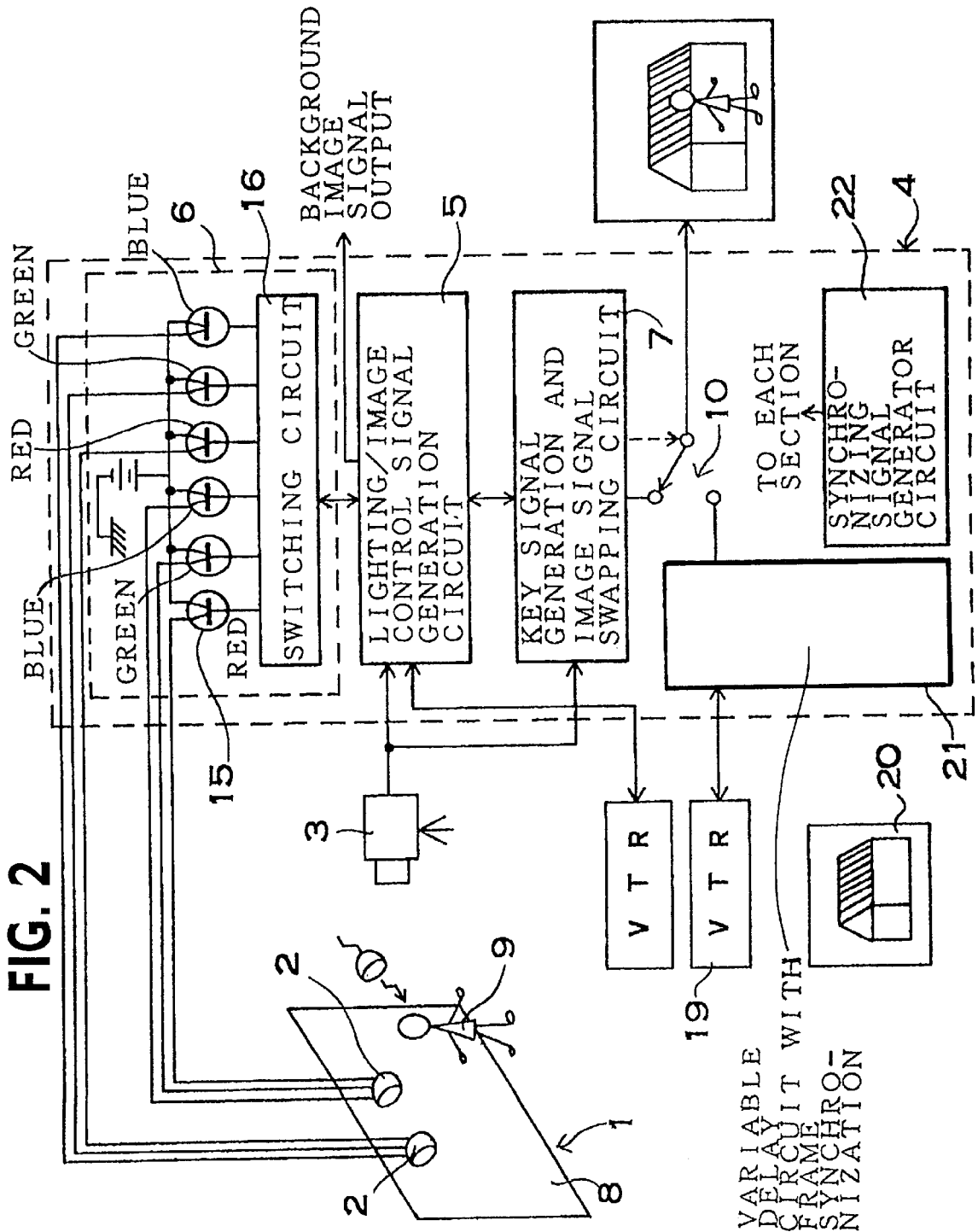
FIG. 2 is a block diagram showing an embodiment of the chroma key system of the present invention.

The chroma key system shown in FIG. 2 is provided with background illumination equipment 2 to illuminate a white or colored screen background 1 and make the background a specified color, a television camera 3 to capture background 1 and non-background 9 subjects in front of the background, and a background discrimination and swapping circuit 4 to discriminate background 1 regions from television camera 3 output and input a different replacement image 20 into the background 1 regions.

The background illumination equipment 2 illuminates the screen 8, which makes up the background 1, and changes background color. The background illumination equipment 2 varies background 1 color by changing either screen 8 color hue, saturation, or brightness, or by changing these three and other elements in combination. Further, the background illumination equipment 2 can also change background color by combining a plurality of colors to make a compound color on the screen and changing that color's component color ratios. The background illumination equipment 2 may vary background color by blinking illumination on and off or by changing luminance. Background color can be changed by blinking or changing the luminance of one element of the background illumination equipment. Or, a plurality of background illumination equipment elements can be blinked or changed in luminance to change background color. Although all elements of background illumination equipment, which changes background color via a plurality of illumination elements, may be blinked on and off or changed in luminance, background color can be changed by blinking or changing the luminance of just some of the elements of the background illumination equipment.

The background illumination equipment 2 of FIG. 2 is provided with three types of LED's; red, green, and blue. Since LED's have fast response time, they are well suited for changing background color at high speeds. Further, background illumination equipment provided with red, green, and blue LED's can make the background white by simultaneous illumination by all LED's, and can change the background in full color by controlling the brightness of each LED.

Fast response time LED's are suitable variable background illumination equipment.

Figure 3:
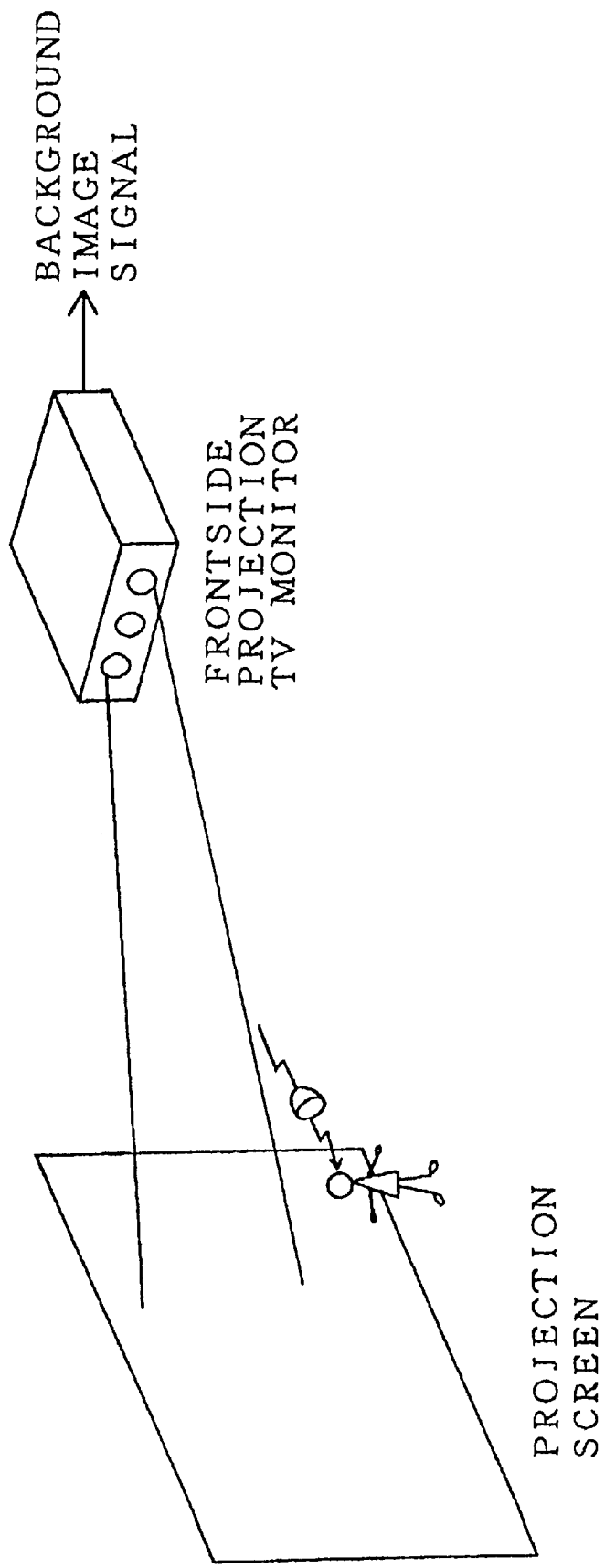
FIG. 3 is an oblique view showing an example of background illumination equipment to change background color.
Figure 4:
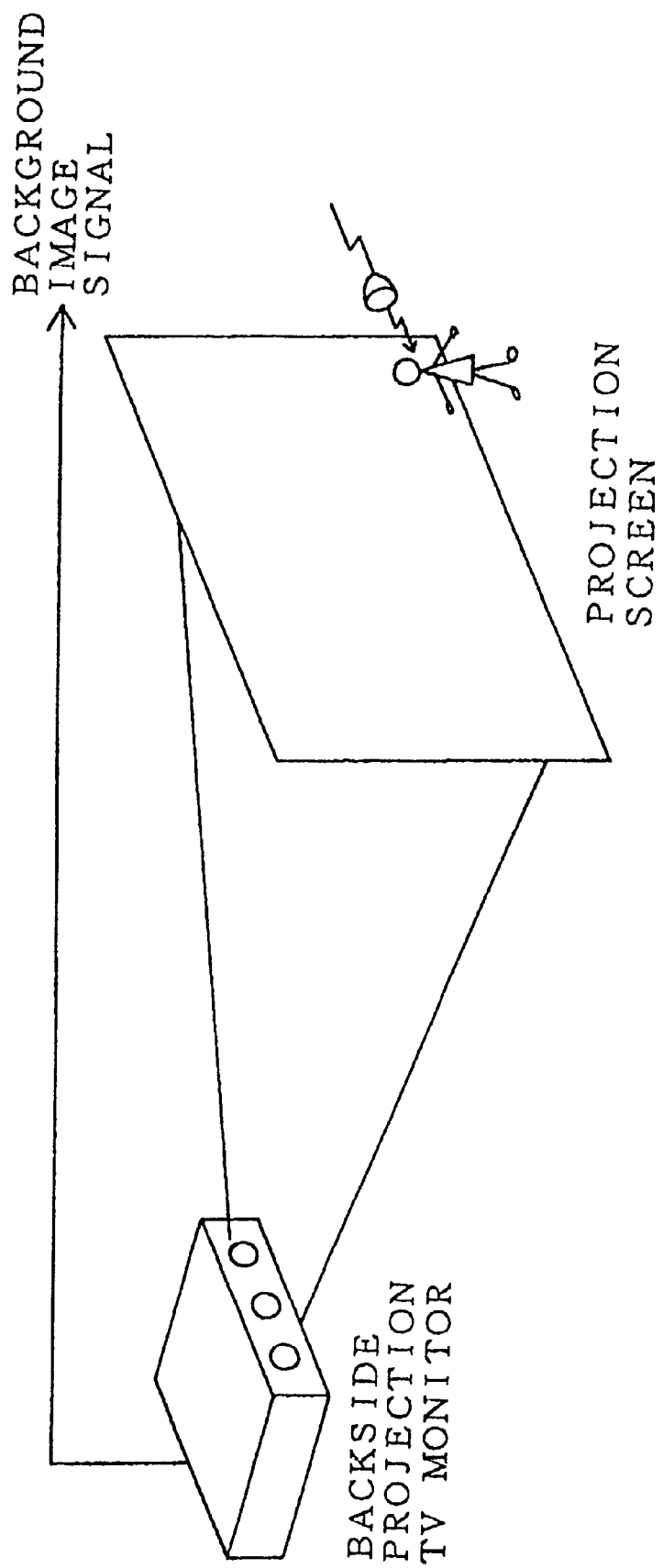
FIG. 4 is an oblique view showing an example of background illumination equipment to change background color.

As shown in FIGS. 3 and 4, projection television can also be used as background illumination equipment to change background color. The projection television of FIG. 3 projects onto the front side of the background screen, and the projection television of FIG. 4 projects onto the back side of the background screen. Further, although not illustrated, the chroma key system of the present invention can also use a television monitor as the entire background and change background color via the television monitor. An image display cathode ray tube monitor or a full color LED display made up of an array of many LED's can be used as the television monitor. Projection television or a television monitor can change the entire background as a single color, change the background color with image information necessary for image synthesis, or change the background partially with different colors. In the chroma key system of the present invention, there is no requirement to make the entire background a single color. Background and non-background can be discriminated when parts of the background are made different colors. Background color can also be changed as motion images for projection television and television monitors.

The chroma key system of the present invention detects change in background color to determine the background region. A plurality of image frames are compared to determine whether or not the background color varies according to specified conditions. For example, if the television camera 3 captures 30 frames per second, the frame frequency is 30 Hz. In this case, if background color is changed with a period of $1/30^{th}$ of a second, the background region can be determined from the changing background color by comparing adjacent frames. Consequently, the background illumination equipment ideally changes background color with a field frequency higher than the frame frequency.

In the chroma key system of the present invention, it is not always necessary to specify the frequency of background color change equal to the frame frequency. For example, images every 30 frames, or frames every one second interval can be compared to determine the background region from background color change. However, as the interval between comparison frames grows longer, cases occur where the border between background and non-background cannot be clearly determined. This occurs when non-background movement is faster than movement that can be captured in the time for variation or strobe of the background color. This drawback can be corrected for accurate discrimination of background and non-background images by performing vector detection of non-background image movement and comparison arithmetic processing of the background image changing according to specified conditions. This type of calculation is not performed for slowly moving non-background subjects, but rather background and non-background can be accurately discriminated even when the frequency of background color change is made slow similar to the non-background movement.

A variable frame frequency high speed camera or camera used in prior art chroma key systems can be used as the television camera 3. However, the television camera is not restricted to one that directly outputs an image signal, and may be of the type that outputs an image recorded on a video tape recorder. Consequently, in this application, the term television camera has a wider meaning to include a video tape recorder which records the television camera image. The video tape recorder which records the television camera image also records along with it the signal specifying background color change.

The background discrimination and swapping circuit 4 is provided with a lighting/image control signal generation circuit 5 which generates a signal to change background color, a lighting control circuit 6 which changes background color by controlling background illumination equipment 2 via a light control signal output from the lighting/image control signal generation circuit 5, a key signal generation and image signal swapping circuit 7 which discriminates background 1 by background color change and replaces the background 1 with a replacement image 20, a variable delay circuit with frame synchronization 21, and a synchronizing signal generator circuit 22 which generates a synchronizing signal to synchronize and drive the entire system.

Figure 5:
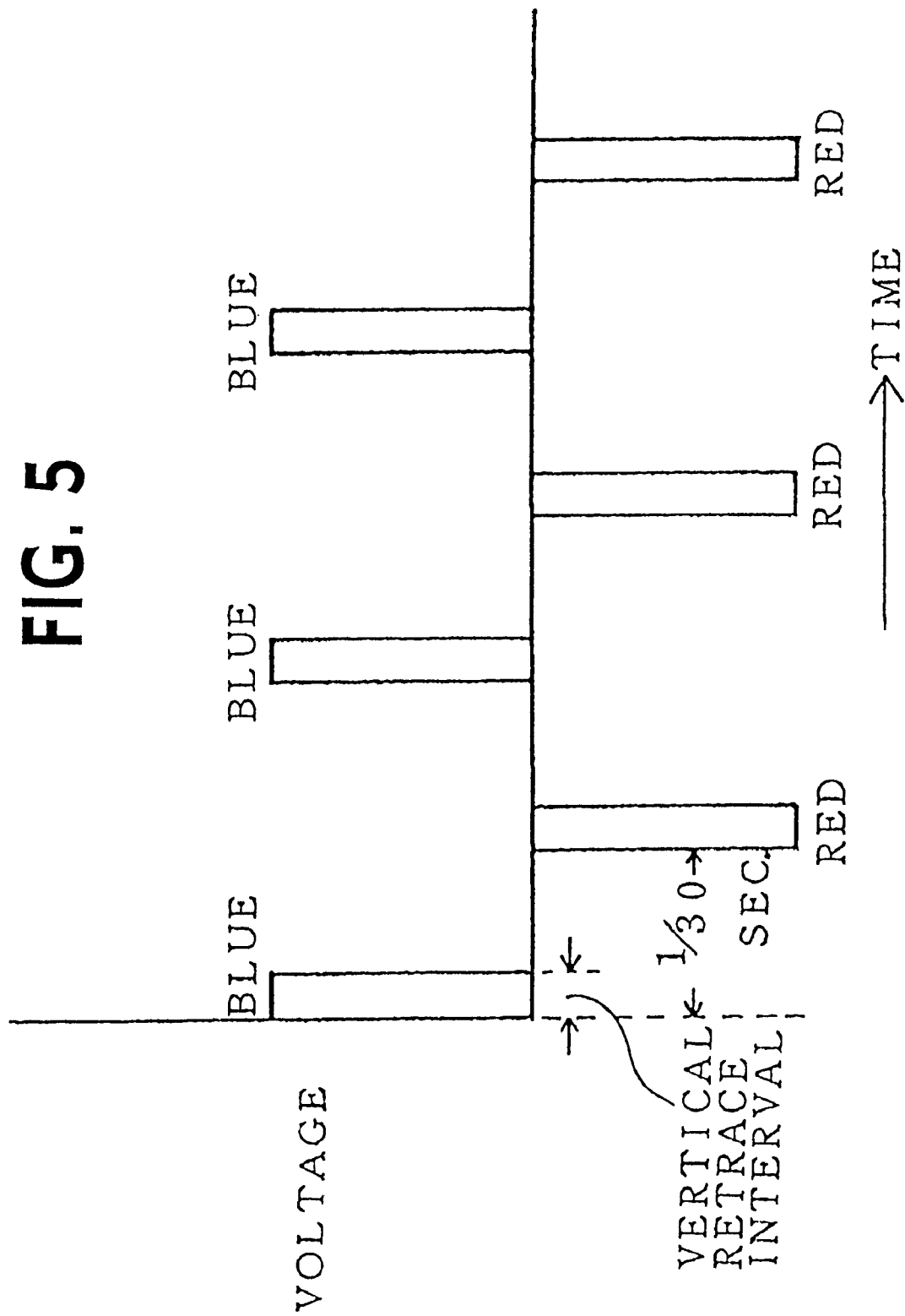
FIG. 5 is a graph showing a light control signal generated by the lighting/image control signal generation circuit.

The lighting/image control signal generation circuit 5 generates a light control signal to change background color at the frame frequency of the television camera 3. For example, the lighting/image control signal generation circuit 5 outputs a light control signal synchronized with the vertical synchronizing signal output from the television camera 3. Turning to FIG. 5, a light control signal is shown. The light control signal of this figure turns on LED's, which are the background illumination equipment, during the vertical retrace interval (vertical blanking interval) of the television camera 3. Blue and red LED's, which are the background illumination equipment, turn on with a period of $1/30^{th}$ of a second during the vertical retrace interval and turn off during periods of useful image scanning. The blue and red LED's are turned on alternately in sequence. As shown in FIG. 5, an apparatus which turns on LED's during the vertical retrace interval via a light control signal can easily discriminate background and non-background. This is because color emitted from LED's activated during the vertical retrace interval is stored and read out from the television camera's charge coupled device (CCD) or camera tube.

The television camera scans a single frame and outputs the image signal for one entire frame with a period of $1/30^{th}$ of a second. During scanning, the output image signal does not output a color signal at a specific instant. A color signal accumulated during the period from the previous frame scan to the next frame scan is output. For example, if the background color is blue during the first frame scanning interval and red during the second frame scanning interval, an all red signal is not output as the image signal for the second frame background region. A compound color of first frame blue and second frame red is output as the background color image signal. In the image signal for the second frame, the beginning of the background is near blue and as the end of the background is approached, it becomes closer to red. The middle is a compound color of blue and red.

A chroma key system which pulses the background illumination equipment to evenly illuminate the background only during the vertical retrace interval can produce image signals with a single color for each frame. This is because color emitted by the background illumination equipment only during the vertical retrace interval is instantaneously stored as background by the television camera's CCD or camera tube. For example, when blue LED's are turned on only during the vertical retrace interval of the first frame, the background region of the first frame is stored as all blue, and successively scanned and output as a blue image signal. A chroma key system which turns on the background illumination equipment only during the vertical retrace interval does not change the background color within each frame. Therefore, background and non-background can be easily discriminated.

In the chroma key system of the present invention, the background illumination equipment may also be turned on at times other than during the vertical retrace interval, and may be turned on during the valid image scanning interval. In this case, background color is accumulated by the television camera's CCD or camera tube resulting in compound colors, and this must be considered to discriminate the background. Since the CCD or camera tube outputs a color signal accumulated during the scanning interval as the image signal, background color changes with scanning time. For example, in the case where the background illumination equipment switches between blue and red illumination at the frame rate, the time for the CCD or camera tube to accumulate the first frame background color and the second frame background color is different depending on location on the image. However, since the background color change characteristics are known, background and non-background can be discriminated accounting for those characteristics.

When the lighting/image control signal generation circuit 5 generates a light control signal to control background illumination equipment 2 LED's as shown in FIG. 5, LED color switches between blue and red. Under these conditions, images output from the television camera for each frame in succession (first frame, second frame, third frame, fourth frame . . . ) change in background color (blue, red, blue, red . . . ).

As described above, when the lighting/image control signal generation circuit 5 changes background color at the same frequency as the television camera 3 frame frequency, background 1 regions can be discriminated by the change in background color from frame to frame. However, as described in the section on background illumination equipment, the lighting/image control signal generation circuit does not necessarily have to change LED activation at the same frequency as the television camera frame frequency. Background color may also be changed at a frequency lower or higher than the television camera frame frequency.

Figure 7:
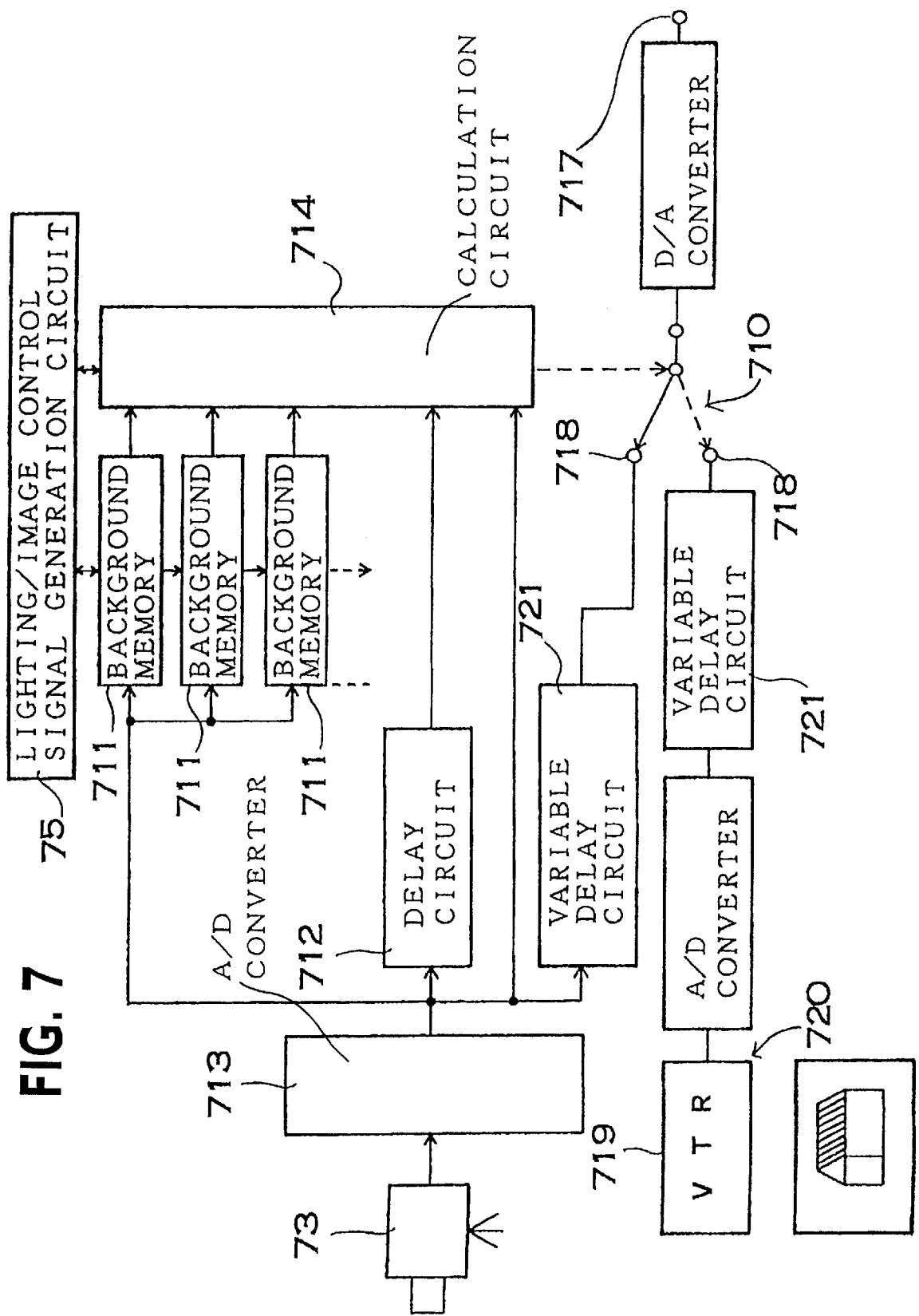
FIG. 7 is a block diagram showing another embodiment of the key signal generation and image signal swapping circuit of the chroma key system shown in FIG. 2.

The lighting/image control signal generation circuit 5 does not have to change background color between blue and red as shown in FIG. 5. For example, background color may also be changed by flashing only blue LED's on and off while constantly illuminating the background with fixed background illumination equipment. Further, with the lighting control circuit 6 shown in FIG. 2, individual red, green, and blue background illumination equipment can be controlled in combination to produce any desired change in background color. A chroma key system which changes background color in this manner can store the changing background color in background memory 711 as shown in FIG. 7. Background memory 711 stores, along with control data, a background image signal output from the television camera 73 when the television camera 73 captures background with non-background removed. The stored background image signal and signals required for lighting control are used by the calculation circuit 714 as signals for background image discrimination, and are used as well for required periodic lighting control.

The lighting control circuit 6 controls the background illumination equipment 2 to change background 1 color via the light control signal output from the lighting/image control signal generation circuit 5. The lighting control circuit 6 contains switching elements 15 such as (bipolar) transistors or field effect transistors (FET's) and a switching circuit 16 to turn the switching elements 15 on and off according to the light control signal. As shown in FIG. 2, the lighting control circuit 6 which strobes the red, green, and blue LED's is provided with switching elements 15 for each of the red, green, and blue LED's. The switching elements 15 for the red LED's are connected in series between the LED power supply and the red LED's, and when the switching elements are turned on, red LED's in the background illumination equipment 2 are illuminated. The switching elements for the green LED's are connected in series between the power supply and the green LED's, and when they are turned on, green LED's are illuminated. Similarly, the switching elements for the blue LED's are connected in series between the power supply and the blue LED's, and when they are turned on, blue LED's are illuminated.

If the light control signal shown in FIG. 5 is input to the switching circuit 16, blue LED switching elements are turned on by positive pulse signals and red LED switching elements are turned on by negative pulse signals. A device which controls three or more pieces of background illumination equipment determines which piece of background illumination equipment to turn on by the light control signal voltage level or pulse width. Or, the brightness of the background illumination equipment turned on may also be controlled by the light control signal voltage level.

The lighting control circuit 6 of FIG. 2 strobes the red LED's, the green LED's, and the blue LED's on and off. However, a lighting control circuit to strobe only a single color of background illumination equipment, such as blue LED's only, need only control switching elements connected to the related background illumination equipment. Therefore, a lighting control circuit, which strobes only background illumination equipment of a single color, has the characteristic that its circuit can be simple.

The key signal generation and image signal swapping circuit 7 discriminates background region with discrimination signal output from the lighting/image control signal generation circuit 5 and image signal input from the television camera 3, and replaces the background region with a separately input replacement image 20. The key signal generation and image signal swapping circuit 7 is provided with a transfer switch 10 to switch between the television camera 3 image signal and the replacement image signal.

Figure 6:
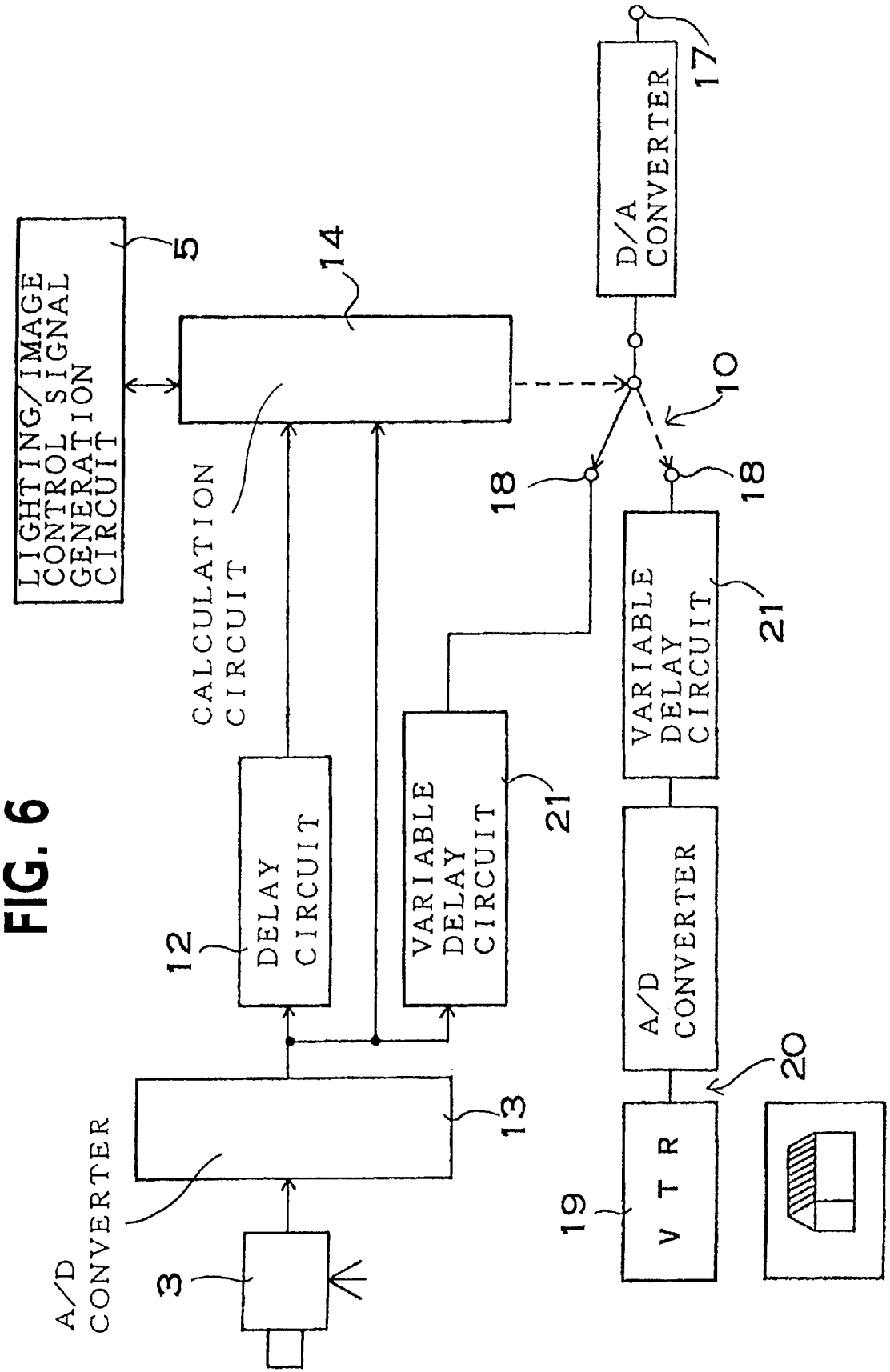
FIG. 6 is a block diagram showing the key signal generation and image signal swapping circuit of the chroma key system shown in FIG. 2.

As shown in FIG. 6, the transfer switch 10 has its common or output side connected to output terminal 17, one of its two input terminals 18 connected to the television camera 3, and the other input terminal 18 connected to a device such as a video tape recorder (VTR) 19 to replace the background. The transfer switch 10 switches between the television camera 3 image signal and the VTR 19 or other device replacement image 20. When the television camera 3 outputs an image signal which is background signal, the transfer switch 10 is switched to the position shown by the broken line of FIG. 6, and the replacement image 20 is output. When the television camera 3 image signal is non-background signal, the transfer switch 10 is switched to the position shown by the solid line of FIG. 6, and the television camera 3 image signal is output. Consequently, the image signal from the television camera 3 is switched to output a signal with the background signal replaced by the replacement image 20.

In FIG. 2, the transfer switch 10 is shown by an arrow symbol to allow circuit operation to be easily understood. In reality, a high speed switching element such as a transistor or FET is used as the transfer switch 10.

The transfer switch 10 is switched by detection of the background region through color change. The key signal generation and image signal swapping circuit of FIG. 6 is provided with an analog to digital converter (A/D converter) 13 to convert the analog image signal output from the television camera 3 to a digital signal, a delay circuit 12 to delay and sequentially output frame data sequentially output from the A/D converter 13 by a delay time equivalent to one frame, a calculation circuit 14 to discriminate the background region of the image signal from the signal output from the delay circuit 12 and A/D converter 13 and from the discrimination signal input from the lighting/image control signal generation circuit 5, and a variable delay circuit 21 to delay the image signal output from the A/D converter 13 by a time delay corresponding to the time required for the calculation circuit 14 to discriminate between background and non-background. The variable delay circuit 21 is a variable delay circuit with frame synchronization to synchronize its output with the replacement image signal.

In the following embodiments, system elements which are the same as for previously described embodiments are labeled by similar numbers, wherein a "7" has been added as a left most digit in each of the numbers for FIG. 7, wherein a "9" has been added as a left most digit for each of the numbers for FIG. 9, and wherein "10" has been added as the two left most digits for each of the numbers for FIG. 10.

In other words, as shown in FIG. 7, the transfer switch 710 has its common or output side connected to output terminal 717, one of its two input terminals 718 connected to the television camera 73, and the other input terminal 718 connected to a device such a video tape recorder (VTR) 719 to replace the background. The transfer switch 710 switches between the television camera 73 image signal the VTR 719 or other device replacement image 720.

Figure 9:
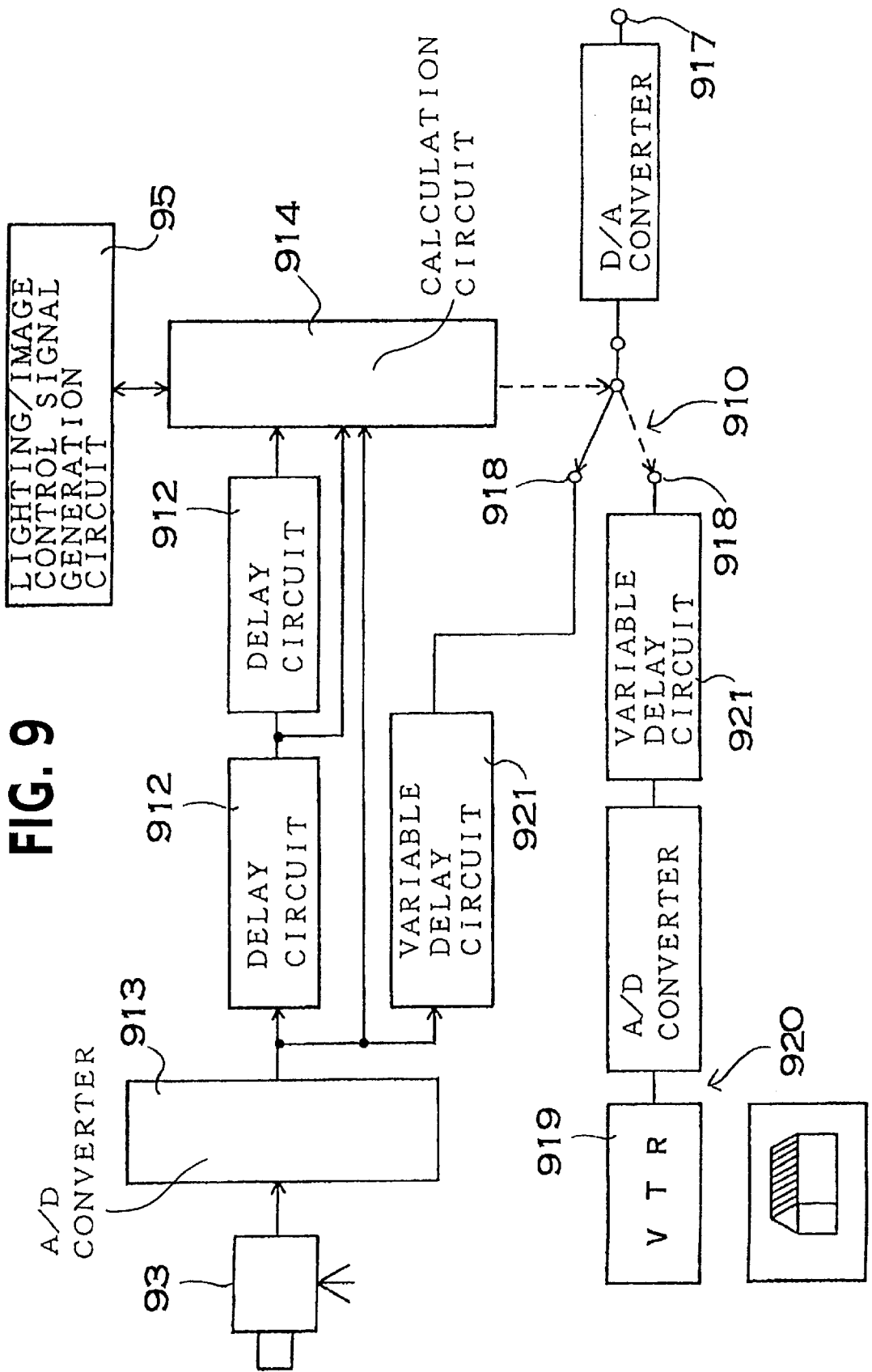
FIG. 9 is a block diagram showing another embodiment of the chroma key system of the present invention.

As shown in FIG. 9, the transfer switch 910 has its common or outside connected to output terminal 917, one of its two input terminals 918 connected to the television camera 93, and the other input terminal 918 connected to a device such a video tape recorder (VTR) 719 to replace the background. The transfer switch 910 switches between the television camera 93 image signal the VTR 919 or other device replacement image 920. Variable delay circuit 921 delays the image signal output from the A/C converter 913 by a time delay corresponding to the time required for the calculation circuits 914 to discriminate between background and non-background.

As shown in FIG. 10, the transfer switch 1010 has its common or output side connected to output terminal 1017, one of its two input terminals 1018 connected to the television camera 103, and the other input terminal 1018 connected to a device such a video tape recorder (VTR) 1019 to replace the background. The transfer switch 1010 switches between the television camera 103 image signal the VTR 1019 or other device replacement image 1020. Variable delay circuit 1021 delays the image signal output from the A/C converter 1013 by a time delay corresponding to the time required for the calculation circuits 1014 to discriminate between background and non-background.

The key signal generation and image signal swapping circuit of FIG. 7 is provided with background memory 711 for storing background color as an image signal. The background memory 711 stores from one to a plurality of frames worth of image signal output from the A/D converter 713, where such an image signal has no non-background. To store an image signal with no non-background in background memory 711, the television camera 73 captures the background with the non-background removed. As a minimum, background memory 711 stores one frame of image signal with no non-background. The background memory 711 of FIG. 7 stores two frames of background image signal. Background memory 711 storage time is preferably one period of the light control signal issued from the lighting/image control signal generation circuit 75, which corresponds to the frame rate of background and non-background that can be discriminated by the calculation circuit 714. When the lighting/image control signal generation circuit 75 changes background color at a frequency of fHz, storage time of the background memory 711 is made 1/f second. For example, when the frame frequency for changing background color is 30 Hz and background color is switched alternately between red and blue, one period of the light control signal is 2/30th of a second. In this case, background memory is 2/30th of a second and two frames of image signal are stored as background. When the frame frequency for changing background color is 30 Hz and background color is switched alternately between the three colors, red, green, and blue, one period of the light control signal is 3/30th of a second, background memory is 3/30th of a second, and three frames of image signal are stored as background. However, it is not always necessary for the background memory to store a plurality of frames of background image signal. This is because the calculation circuit can determine background from one frame of background image signal stored in background memory and the discrimination signal.

A system, which A/D converts an image signal with no non-background from the television camera and stores it in background memory as a background image signal, inputs a background image signal into background memory from the television camera. The television camera, which inputs an image signal with no non-background into background memory, captures a scene with background only, that is with no non-background, and outputs that image signal. The image signal from the television camera is input and stored in background memory as a background image signal. The calculation circuit discriminates a signal, which is the same as the background image signal stored in background memory, as background, and thus determines the background regions of an image signal captured by the television camera that includes non-background. In this type of chroma key system, a screen does not need to be used in the background, the existing background in the studio can be used as is, and the background regions can be determined by changing background color with the background illumination equipment. This is because the existing studio background with no non-background can be input from the television camera directly into background memory as a background image signal. Consequently, this chroma key system can discriminate background from non-background for a television camera image signal taken with existing studio or other unaltered background without requiring any special conditions for the background.

Background memory 711 stores an A/D converted image signal and a synchronizing signal output from the television camera 73 as a background image signal. Background memory 711 is synchronized with the light control signal output from the lighting/image control signal generation circuit 75 and stores an image signal with no non-background input from the television camera along with required control signals. Background memory 711 is synchronized with the light control signal, and the light control signal changes background color by controlling the background illumination equipment. The changing background color is captured by the television camera 73 and stored sequentially as background image signal. The light control signal synchronized background image signals stored in background memory are read out as signals necessary for control and discrimination and are output to the lighting/image control signal generation circuit 75 and calculation circuit 714.

A chroma key system, which has a plurality of frames of background image signal stored in background memory, can randomly output that plurality of stored frames of background image signal to the lighting/image control signal generation circuit to change the order of background color change via the background image signal stored in background memory. For example, a background memory storing three frames of background image signal does not need to output a background image signal to the calculation circuit and lighting/image control signal generation circuit with a frame order 1, 2, 3, but rather it can output a background image signal to the lighting/image control signal generation circuit with frame orders such as 1, 3, 2, or 3, 2, 1. The lighting/image control signal generation circuit controls the lighting control circuit with the background image signal input from background memory and changes background color according to the background color stored in background memory.

A chroma key system, which changes background color by randomly controlling the order of a plurality of frames of background image signal stored in background memory, has the characteristic that background and non-background can be more accurately discriminated when non-background changes in the same order as background color.

The delay circuit 12 time delays the signal output from the A/D converter 13 by a time corresponding to one frame. For example, when the television camera 3 frame frequency is 30 Hz thereby outputting 30 frames per second and background color changes every frame, the delay circuit 12 adds a time delay of $1/30^{th}$ of a second corresponding to the time for one frame. In the case of a different television system standard, a time delay corresponding to the time for one frame in that system is implemented.

The calculation circuit 14 of FIG. 6 performs calculations on two frames of image signal from the input side and the output side of the delay circuit 12 and on the discrimination signal from the lighting/image control signal generation circuit 5 to determine whether the signal is background. The calculation circuit 714 of FIG. 7 performs calculations on two frames of image signal from the input side and the output side of the delay circuit 712, on the discrimination signal from the lighting/image control signal generation circuit 75, and on the background image signal from background memory 711 to determine background region. For example, when the lighting/image control signal generation circuit 5 makes the first frame background color blue, the second frame background color red, and alternately switches from blue to red as shown in FIG. 5, the key signal generation and image signal swapping circuit of FIG. 6 detects background 1 regions by color change according the following operation.

(1) The television camera 3 outputs the first frame, the second frame, and the third frame etc. of image signal in sequence. An analog image signal output from the television camera 3 is converted to a digital signal by the A/D converter 13.

(2) The converted digital image signal for the first frame is input to the delay circuit 12 and the variable delay circuit 21.

(3) The delay circuit 12 time delays the first frame of image signal by one frame. The variable delay circuit 21 delays the first frame of image signal by the time for the calculation circuit 14 perform calculations and switch the transfer switch 10.

(4) Image signals from the input side and the output side of the delay circuit 12 are input to the calculation circuit 14. When the image signal output from the delay circuit 12 into the calculation circuit 14 is the first frame image signal, the image signal, which bypasses the delay circuit 12 and is directly input into the calculation circuit 14 from the A/D converter 13, is the second frame image signal. The first frame and second frame image signals are synchronized and input to the calculation circuit 14.

Figure 8:
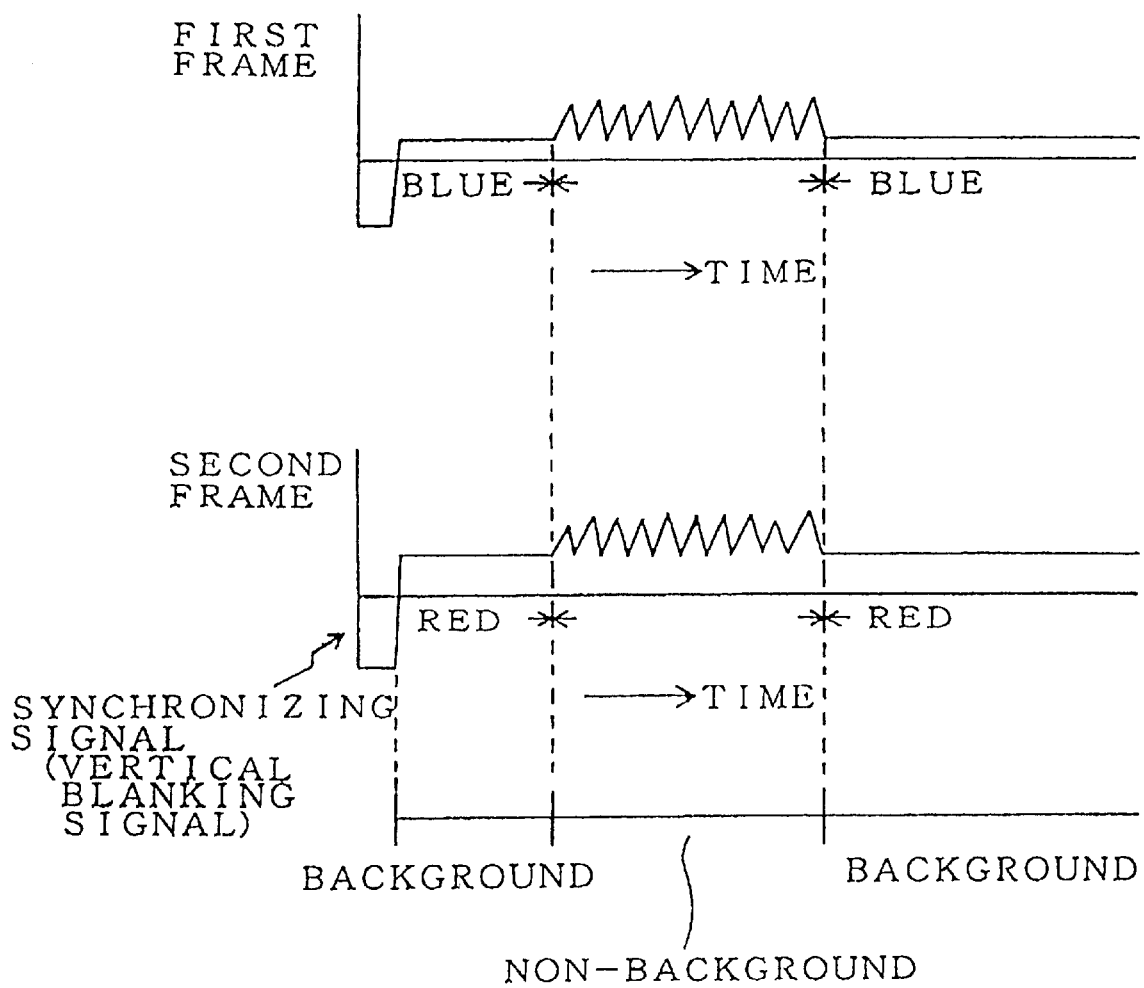
FIG. 8 is a graph showing a comparison of the first frame and second frame image signals.

(5) Under these circumstances, the first frame image signal and second frame image signal are synchronized and input to the calculation circuit 14 as shown in FIG. 8. Then the first frame image signal blue regions and the second frame image signal red regions are the same as the background colors and are recognized as background regions.

(6) When the calculation circuit 14 determines the image signal to be background signal, the transfer switch 10 is switched to the broken line position and a replacement image from a VTR or other source is output in place of the background. When the calculation circuit 14 determines the image signal to be non-background signal, the transfer switch 10 is put in the solid line position and the television camera 3 image signal is output.

The key signal generation and image signal swapping circuit of FIG. 7 detects background regions by the changing background color according the following operation.

(1) The television camera 73 captures the background with no non-background in the picture and outputs the first frame, the second frame, and the third frame etc. of image signal in sequence. An analog image signal output from the television camera 73 is converted to a digital signal by the A/D converter 713.

(2) The converted digital image signals for the first frame and second frame are stored in the background memory 711 as background image signals. Since the lighting/image control signal generation circuit 75 alternately switches background lighting from blue to red, the background image signals input to the background memory 711 from the television camera 73 are blue for the first frame and red for the second frame.

(3) After the background image signals have been stored in background memory 711, the television camera 73 now captures both background and no non-background and outputs the first frame, the second frame, and the third frame etc. of image signal in sequence. The analog image signal output from the television camera 73 is converted to a digital signal by the A/D converter 713 and input to the delay circuit 712 and the variable delay circuit 721.

(4) The delay circuit 712 time delays the first frame of image signal by one frame. The variable delay circuit 721 delays the first frame of image signal by the time for the calculation circuit 714 perform calculations and switch the transfer switch 710.

(5) Image signals from the input side and the output side of the delay circuit 712 are input to the calculation circuit 714. When the image signal output from the delay circuit 712 into the calculation circuit 714 is the first frame image signal, the image signal, which bypasses the delay circuit 712 and is directly input into the calculation circuit 714 from the A/D converter 713, is the second frame image signal. The first frame and second frame image signals are synchronized and input to the calculation circuit 714. The background image signal from the background memory 711 is synchronized with the light control signal and input to the calculation circuit 714.

(6) Under these circumstances, the first frame image signal and second frame image signal are input to the calculation circuit 714 as shown in FIG. 8. In addition, the background image signals stored in the background memory 711 and the discrimination signals from the lighting/image control signal generation circuit 75 are synchronized with the image signals and input to the calculation circuit 714. The calculation circuit 714 determines from the background image signals that blue regions in first frame image signal and red regions in the second frame image signal are the same as the background colors and recognizes those regions as background.

(7) When the calculation circuit 714 determines the image signal to be background signal, the transfer switch 710 is switched to the broken line position and a replacement image from a VTR or other source is output in place of the background. When the calculation circuit 714 determines the image signal to be non-background signal, the transfer switch 710 is put in the solid line position and the television camera 73 image signal is output.

In the calculation circuit 714 described above, when the first and second frame image signal are compared, background 1 is discriminated when the first frame image signal is blue and the second frame image signal is red. Continuing, when the second frame image signal and third frame image signal are input, background 1 is discriminated when the second frame image signal is red and the third frame image signal is blue. To determine image signal background color, the discrimination signal is input from the lighting/image control signal generation circuit 75 or a signal is input from the background memory 711 to the calculation circuit 714. In other words, the discrimination signal from the lighting/image control signal generation circuit 75 and the background image signal from the background memory 711 are signals input to the calculation circuit 714 to determine the background color of each frame.

The calculation circuit requires calculation time to input adjacent frames of image signal and calculate background and non-background regions of the input image signals. For example, if the time to calculate background and non-background for the first and second frames of image signal input to the calculation circuit 14, 714 of FIGS. 6 and 7 is 10 msec, the variable delay circuit 21, 721 delays its signal for input to the transfer switch 710 by one image signal frame plus 10 msec. The variable delay circuit 21, 721 compensates for the calculation time of the calculation circuit 14, 714. Consequently, the image signal output from the variable delay circuit 21, 721 is synchronized with the timing of the calculation circuit 714 switching the transfer switch 10, 710 between background and non-background.

The chroma key system described above shows a specific example of a system that switches background color between blue and red at the frame frequency. This type of chroma key system has the characteristic that background can be discriminated with simple circuitry. However, the chroma key system of the present invention is not restricted to a system that changes background color between two colors. Background color can also be switched between three or more colors such as red, green, and blue, etc. A chroma key system that changes background color to three or more colors can discriminate background more accurately. This system is provided with two delay circuits 912, 1012 as shown in FIGS. 9 and 10. Three frames of image signal, the discrimination signal, and the background image signal from background memory 1011 are input to the calculation circuit 1014. As illustrated in FIG. 9, the calculation circuit 914 inputs the discrimination signal from the lighting/image control signal generation circuit 95 to discriminate background for the three frames of image signal and switch the transfer switch 910. As illustrated in FIG. 10, the calculation circuit 1014 inputs the discrimination signal from the lighting/image control signal generation circuit 105, or the background image signal from the background memory 1011, or both to discriminate background for the three frames of image signal and switch the transfer switch 1010.

The chroma key system described above discriminates background and non-background by the background color of each frame, where the background color of each frame is a single color. In the chroma key system of the present invention, the color of the entire background of each frame does not always have to be a single color. Background and non-background can be discriminated with different colors for different regions of the background. In a chroma key system with different colored regions of background, light sources which illuminate different regions of the background with different colors and changes those colors, a projection television, or a television monitor can be used as background illumination equipment. A projection television or television monitor uses the light control signal output from the lighting/image control signal generation circuit, which is the background image signal, for display on the background screen or monitor as changing background colors. The projection screen or television monitor displays an image which is a single color, or one with different background color in different regions. Further, the displayed background colors are colors which change. A replacement image signal may also be used as the background image signal, or it can be processed.

Since background color changes in different regions of a single image signal frame for this type of chroma key system, the lighting/image control signal generation circuit outputs a background image signal as the light control signal input to the projection television or television monitor. The projection television or television monitor, which inputs the background image signal, is captured by the television camera with no non-background, and the television camera output is stored as background image signal in the background memory. The background image signal stored in background memory is synchronized with the image signal from the television camera and input to the calculation circuit.

The calculation circuit inputs background image signal from the background memory to determine changing background color in each frame of image signal and discriminate background. When the calculation circuit determines from the frame background image signal that the input signal is background, it switches the transfer switch to replace the image signal from the television camera with a replacement image signal.

Since the chroma key system described above converts the image signal to a digital signal and switches the transfer switch, the replacement image signal is also converted to a digital signal and passed through a variable delay circuit with frame synchronization into the transfer switch. The output of the transfer switch is converted to an analog signal by a digital to analog (D/A) converter and then output. However, the output from the transfer switch may also be output directly as a digital signal.

In the chroma key system shown in FIGS. 6 and 7, the image signal which bypasses the delay circuit 12, 712 is input to the transfer switch 10, 710 after time delay by the variable delay circuit 21, 721. However, in the chroma key system of the present invention, the image signal may also be input to the transfer switch through the variable time delay circuit and after passing through the time delay circuit.

Finally, although the embodiments of the chroma key system described above change background color every frame, background color may also be changed repeatedly after a plurality of frames. A chroma key system, which changes background color repeatedly after a plurality of frames, stores image signals for changing or flashing background color, in a contiguous fashion along with lighting/image control signal generation circuit 75 control signals in T seconds worth of background memory.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A chroma key system for use with an image device and illumination equipment, the image device being operable to obtain an image of a subject and a background of the subject and to provide an image signal corresponding to the image, the illumination equipment being operable to provide a colored illumination to the background to change a color of the background to an altered color, said chroma key system comprising:

a background discriminating and swapping circuit operable to control the illumination equipment so as to provide a change to the colored illumination thereby changing the altered color and being operable to discriminate the subject from the background using information within the image signal based on said change to the colored illumination.

2. The chroma key system of claim 1, wherein said background discriminating and swapping circuit is operable to control the illumination equipment so as to provide the colored illumination to the background such that the entire background is a single color at any given time.

3. The chroma key system of claim 1, wherein said background discriminating and swapping circuit is operable to periodically turn on and off the illumination equipment such that the colored illumination is a periodically changing colored illumination.

4. A chroma key system for use with an image device that is operable to obtain an image of a subject and a background of the subject and to provide an image signal corresponding to the image, said chroma key system comprising:

at least one light emitting diode operable to provide a colored illumination to the background to change a color of the background to an altered color;

a background discriminating and swapping circuit operable to control said at least one light emitting diode so as to provide a change to the colored illumination thereby changing the altered color and being operable to discriminate the subject from the background using information within the image signal based on said change to the colored illumination.

5. The chroma key system of claim 4, wherein said at least one light emitting diode comprises a red light emitting diode, a green light emitting diode and a blue light emitting diode.

6. The chroma key system of claim 4, wherein said background discriminating and swapping circuit is operable to turn on and off said at least one light emitting diode so as to change the altered color.

7. The chroma key system of claim 4, wherein said background discriminating and swapping circuit is operable to control the luminance of said at least one light emitting diode so as to change the altered color.

8. The chroma key system of claim 4, wherein said background discriminating and swapping circuit is operable to periodically turn on and off said at least one light emitting diode such that the colored illumination is a periodically changing colored illumination.

9. A chroma key system for use with an image device that is operable to obtain an image of a subject and a background of the subject and to provide an image signal corresponding to the image, said chroma key system comprising:

a screen having a screen color, said screen disposed so as to provide the background;

at least one light emitting diode operable to provide a colored illumination to said screen to change the screen color to an altered color;

a background discriminating and swapping circuit operable to control said at least one light emitting diode so as to provide a change to the colored illumination thereby changing the altered color and being operable to discriminate the subject from the background using information within the image signal based on said change to the colored illumination.

10. The chroma key system of claim 9, wherein the screen color comprises a screen color hue and a screen color saturation, and wherein said background discriminating and swapping circuit is operable to control said at least one light emitting diode so as to change the screen color by changing at least one of the screen color hue and the screen color saturation.

11. The chroma key system of claim 9, wherein said at least one light emitting diode comprises a first light emitting diode capable of emitting light of a first color and a second light emitting diode capable of emitting light of a second color, wherein said background discriminating and swapping circuit is operable to control said first light emitting diode and said second light emitting diode such that the altered color comprises the first color and the second color, and wherein said background discriminating and swapping circuit is operable to control said first light emitting diode and said second light emitting diode so as to change the altered color by changing a ratio of the amount of at least one of the first color and the second color.

12. The chroma key system of claim 9, wherein said background discriminating and swapping circuit is operable to periodically turn on and off said at least one light emitting diode such that the colored illumination is a periodically changing colored illumination.

13. A chroma key system comprising:

at least one light emitting diode operable to provide a colored illumination to a background to illuminate the background in an altered color;

a television camera operable to obtain an image of a subject and the background and to provide an image signal corresponding to the image;

a background discriminating and swapping circuit operable to control said at least one light emitting diode so as to provide a change to the colored illumination thereby changing the altered color and being operable to discriminate the subject from the background using information within the image signal based on said change to the colored illumination.

14. The chroma key system of claim 13, wherein said television camera has a vertical retrace interval associated therewith, wherein said background discriminating and swapping circuit is operable to control said at least one light emitting diode so as to illuminate said at least one light emitting diode during the vertical retrace interval.

15. The chroma key system of claim 13, wherein said television camera has a frame frequency associated therewith, and wherein said background discriminating and swapping circuit is operable to control said at least one light emitting diode so as to periodically illuminate said at least one light emitting diode at a frequency that is higher than the frame frequency.

16. The chroma key system of claim 13, wherein said television camera has a frame frequency associated therewith, and wherein said background discriminating and swapping circuit is operable to control said at least one light emitting diode so as to periodically illuminate said at least one light emitting diode at a frequency that is synchronized with the frame frequency.

17. The chroma key system of claim 13, wherein said background discriminating and swapping circuit further comprises:

a lighting/image control signal generation circuit operable to generate a light control signal and a discrimination signal;

a lighting control circuit operable to control said at least one light emitting diode in response to the light control signal; and a key signal generation and image signal swapping circuit operable to discriminate the background from the subject by way of the discrimination signal and the image signal and operable to replace a portion of the image corresponding to the background with a replacement image.

18. The chroma key system of claim 17, wherein said lighting control circuit comprises a background memory that is capable of storing information corresponding to the change to the colored illumination.

19. The chroma key system of claim 18, wherein said background memory is further capable of storing information corresponding to control data and information corresponding to the image signal from said television camera when said camera receives an image excluding the subject.

20. The chroma key system of claim 17, wherein said television camera has a vertical retrace interval associated therewith, wherein said lighting/image control signal generation circuit is operable to generate the light control signal so as to illuminate said at least one light emitting diode during the vertical retrace interval.

* * * * *